United States Patent
Mongeau et al.

(10) Patent No.: US 11,522,395 B2
(45) Date of Patent: Dec. 6, 2022

(54) RELATING TO THE MOUNTING OF STATORS IN GENERATORS FOR WIND TURBINES

(71) Applicant: Vestas Wind Systems A/S, Aarhus N. (DK)

(72) Inventors: Peter Mongeau, Center Conway, NH (US); Lars Langvardt Krogh, Egå (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 17/420,224

(22) PCT Filed: Jan. 8, 2020

(86) PCT No.: PCT/DK2020/050002
§ 371 (c)(1),
(2) Date: Jul. 1, 2021

(87) PCT Pub. No.: WO2020/143885
PCT Pub. Date: Jul. 16, 2020

(65) Prior Publication Data
US 2022/0069644 A1 Mar. 3, 2022

Related U.S. Application Data

(60) Provisional application No. 62/790,550, filed on Jan. 10, 2019.

(30) Foreign Application Priority Data

Jan. 30, 2019 (DK) .......................... PA 2019 70064

(51) Int. Cl.
*H02K 1/18* (2006.01)
*F03D 9/25* (2016.01)
(Continued)

(52) U.S. Cl.
CPC ............... *H02K 1/185* (2013.01); *F03D 9/25* (2016.05); *F03D 13/20* (2016.05); *H02K 7/116* (2013.01);
(Continued)

(58) Field of Classification Search
CPC ...... H02K 1/185; H02K 7/116; H02K 7/1838; H02K 2213/12; H02K 1/148; F03D 9/25; F03D 13/20; F05B 2220/706
(Continued)

(56) References Cited

U.S. PATENT DOCUMENTS 8,319,405 B2  11/2012  Allen et al.
9,359,994 B2  6/2016  Bywaters et al.
(Continued)

FOREIGN PATENT DOCUMENTS

DE  102013219163 A1  3/2015
EP       2273652 A1  1/2011
(Continued)

OTHER PUBLICATIONS

Danish Patent and Trademark Office, Search and Examination Report in PA 2019 70064, dated Sep. 26, 2019.
(Continued)

*Primary Examiner* — Charles Reid, Jr.
(74) *Attorney, Agent, or Firm* — Wood Herron & Evans LLP

(57) ABSTRACT

In a first aspect of the invention there is provided a generator for a wind turbine. The generator includes a stator which defines a central axis of the generator, the stator being mounted within a frame by a stator mounting system. The stator mounting system includes a plurality of stator mounting modules, each stator mounting module being removably attached to the stator and removably attached to the frame. The stator mounting system is arranged so that one or more
(Continued)

of the stator mounting modules can be replaced or repositioned with the stator mounted in situ within the frame.

25 Claims, 9 Drawing Sheets

(51) Int. Cl.
 *F03D 13/20* (2016.01)
 *H02K 7/116* (2006.01)
 *H02K 7/18* (2006.01)

(52) U.S. Cl.
 CPC ...... *H02K 7/1838* (2013.01); *F05B 2220/706* (2013.01); *F05B 2240/912* (2013.01); *H02K 2213/12* (2013.01)

(58) Field of Classification Search
 USPC ..................................................... 290/44, 55
 See application file for complete search history.

(56) References Cited

U.S. PATENT DOCUMENTS

| | | |
|---|---|---|
| 2008/0309189 A1 | 12/2008 | Pabst et al. |
| 2009/0256430 A1 | 10/2009 | Farnia |
| 2012/0133142 A1 | 5/2012 | Langel |
| 2013/0270837 A1* | 10/2013 | Mongeau ................ F03D 13/10 290/1 C |
| 2014/0133985 A1* | 5/2014 | Mongeau ................ F16C 17/02 416/174 |

FOREIGN PATENT DOCUMENTS

| | | |
|---|---|---|
| EP | 2924848 A1 | 9/2015 |
| EP | 3258099 A1 | 12/2017 |
| WO | 2010069300 A2 | 6/2010 |
| WO | 2014072338 A1 | 5/2014 |

OTHER PUBLICATIONS

European Patent Office, International Search Report and Written Opinion in PCT Application No. PCT/DK2020/050002, dated May 7, 2020.

* cited by examiner

RELATING TO THE MOUNTING OF STATORS IN GENERATORS FOR WIND TURBINES

TECHNICAL FIELD

The present invention relates generally to a generator for a wind turbine and more specifically to apparatus for mounting a stator of the generator.

BACKGROUND

Modern commercial-scale wind turbines comprise a generator to produce electricity from wind power. Amongst other sub-assemblies, the generator of a wind turbine typically comprises a stator mounted to a support frame or generator housing, and a rotor mounted on and driven by an output shaft of a gearbox. The field windings are formed of densely packed coils of a conductive material such as copper and as such the stator has a significant mass and must be supported accordingly.

In use, an electrical current is induced in field windings of the stator by a fluctuating magnetic field produced by the rotation of permanent magnets located within the rotor. To ensure optimised and symmetric electrical power generation, it is critical to ensure that the rotor is well centred within the stator and that the air gap between the rotor and stator is symmetrical. In existing generators it is typical to rely on manufacturing and assembly tolerances to achieve this. This is a particular challenge for generators which have the rotor mounted on, and supported only by, the gearbox output shaft as the relative position of the rotor with respect to the stator is reliant on the position the gearbox output shaft and its bearings.

In some generators, supporting the stator comprises welding the stator to a metal frame. Although static loads of the stator may be adequately supported in this manner, welded joints in a generator can be problematic due to significant structure-borne vibrations caused by the fluctuating magnetic loads produced as the magnetic field rotates within the stator in use. Such structure-borne vibrations are transmitted to the housing by the welded joints and radiated by the housing as air-borne noise. In addition, it is not possible to adjust the stator torsional stiffness with respect to the generator power train so as to optimally control torsional resonances of the power train once the welded joint has been formed.

Further, as a result of the high currents running through the field windings, a great deal of thermal energy is created by the stator sub-assembly. The resultant thermal expansion of some generator components is further problematic to welded joints which have little or no radial compliance.

Improvements on welded connections between the stator and support frame have been developed for example in EP2924848 A1 and U.S. Pat. No. 8,319,405 B2. However, such connection methods can be complex and may be difficult to access and maintain or adjust in-situ when the generator is assembled in a wind turbine.

Maintenance of the load bearing support elements of the generator may be required at some time during the lifetime of the generator. The stator is a critical component of the generator without which the wind turbine cannot function. It is therefore of high importance than any maintenance work be completed quickly in order to minimise turbine down time in which the wind turbine does not produce electricity.

It is against this background that the present invention has been developed.

SUMMARY OF THE INVENTION

In a first aspect of the invention there is provided a generator for a wind turbine. The generator comprises a stator which defines a central axis of the generator, the stator being mounted within a frame by a stator mounting system. The stator mounting system comprises a plurality of stator mounting modules, at least one stator mounting module being removably attached to the stator and removably attached to the frame. The stator mounting system is arranged so that one or more of the stator mounting modules can be replaced or repositioned with the stator mounted in place or 'in situ' within the frame.

The generator of the present invention is advantageous as the position and characteristics of the stator mounts may be adjusted while the stator is mounted in situ within its housing. The stator mounting modules can be removed, replaced, adjusted or otherwise manipulated whilst the stator remains within the frame, which is a significant benefit in terms of maintainability of the generator, positioning of the stator with respect to the rotor, and vibrational and noise performance.

In a preferred embodiment of the invention, each stator mounting module is removable attached to the stator and removably attached to the frame.

The frame may comprise a frame cover having an access opening through which one or more of the stator mounting modules can be accessed for replacement or repositioning or other adjustment. The frame cover may comprise an access panel removably fitted within or over the access opening.

The frame may comprise a plurality of axially extending members with respect to the central axis of the generator, wherein at least some of the mounting modules extend between two of the axially extending members.

Each stator mounting module may be adjustably attached to the frame by an adjustable fixture to provide ready adjustability.

Each stator mounting module may comprise a resilient member and a mounting member, wherein the mounting member is removably attached to the stator and the resilient member is removably attached to the frame. The mounting member may be removably attached to the resilient member so that either part may be adjusted or replaced independently of the other.

The resilient member may comprise a beam having a first end and a second end, wherein the first and second ends of the beam are removably attached to the frame. The beam may extend in a direction substantially perpendicular to a central axis of the stator.

The mounting member of a least one of the mounting modules may be of laminate construction comprising a plurality of discrete layers arranged in a stack, wherein at least one of the layers comprises a first material, and wherein at least another of the layers comprises a second material, where the first and second materials are different from one another, and wherein the layers are stacked in a direction substantially parallel to the central axis of the generator. At least one of the layers of the mounting member may comprise an electrically insulating material. Such an arrangement provides greater tunability of both the mechanical and electrical performance of the stator mounting module.

At least one first layer of the mounting member may comprise one or more keys, and at least one second layer may comprise one or more recesses. The first and second layers may be adjacent to one another, and the one or more keys of the first layer may engage with the one or more recesses of the second layer. This can be beneficial for the transmission of torsional loads from the stator to the frame.

One or more of the mounting members may comprise a key or a keyhole for engagement with a co-operating keyhole or key located on the stator. One or more of the mounting members may comprise a key or a keyhole for engagement with a co-operating keyhole or key located on the resilient member. This can be beneficial for the transmission of torsional loads from the stator to the frame.

The stator mounting system may comprise a plurality of stator mounting bays located equidistantly around an outer circumference of the stator. Each stator mounting bay may comprise at least one stator mounting module. Each stator mounting bay may comprise a plurality of stator mounting modules arranged spaced from one another along a direction substantially parallel with the central axis of the generator. The provision of such bays provides ready access to the stator mounting modules for replacement or adjustment, and the grouping of the stator mounting modules in bays simplifies the overall design of the generator.

The mechanical properties and/or configuration of a first stator mounting module may differ from the mechanical properties and/or configuration of a second stator mounting module to improve the tunability of the stator mounting system.

In another aspect of the invention there is provided a method for maintaining a generator for a wind turbine, the generator having any of the features described above. The method comprises removing at least a part of at least one stator mounting module while at least one other stator mounting module remains attached between the frame and the stator, and installing at least one replacement part of the at least one stator mounting module. This is beneficial as any required replacement and/or adjustment to the stator mounts may be made while the stator is mounted within its housing.

In yet a further aspect of the invention there is provided a method for adjusting the stator mount configuration of a generator for a wind turbine, the generator having any of the features described above. The method comprises detaching at least one stator mounting module from a first position while at least one other stator mounting module remains attached between the frame and the stator, and reattaching the at least one stator mounting module in a second position. Again, this is beneficial as any required adjustment to the stator mounts may be made while the stator is mounted within its housing.

In a still further aspect, the present invention provides a wind turbine comprising a wind turbine tower, a nacelle rotatably coupled to the tower, a rotating hub mounted to the nacelle, and a plurality of wind turbine blades coupled to the hub, wherein the nacelle comprises a generator as described above.

BRIEF DESCRIPTION OF THE DRAWINGS

Non-limiting examples of the present invention will now be described with reference to the accompanying drawings, in which.

DETAILED DESCRIPTION

A specific embodiment of the present invention will now be described in which numerous features will be discussed in detail in order to provide a thorough understanding of the inventive concept as defined in the claims. However, it will be apparent to the skilled person that the invention may be put in to effect without the specific details and that in some instances, well known methods, techniques and structures have not been described in detail in order not to obscure the invention unnecessarily.

Figure 1:
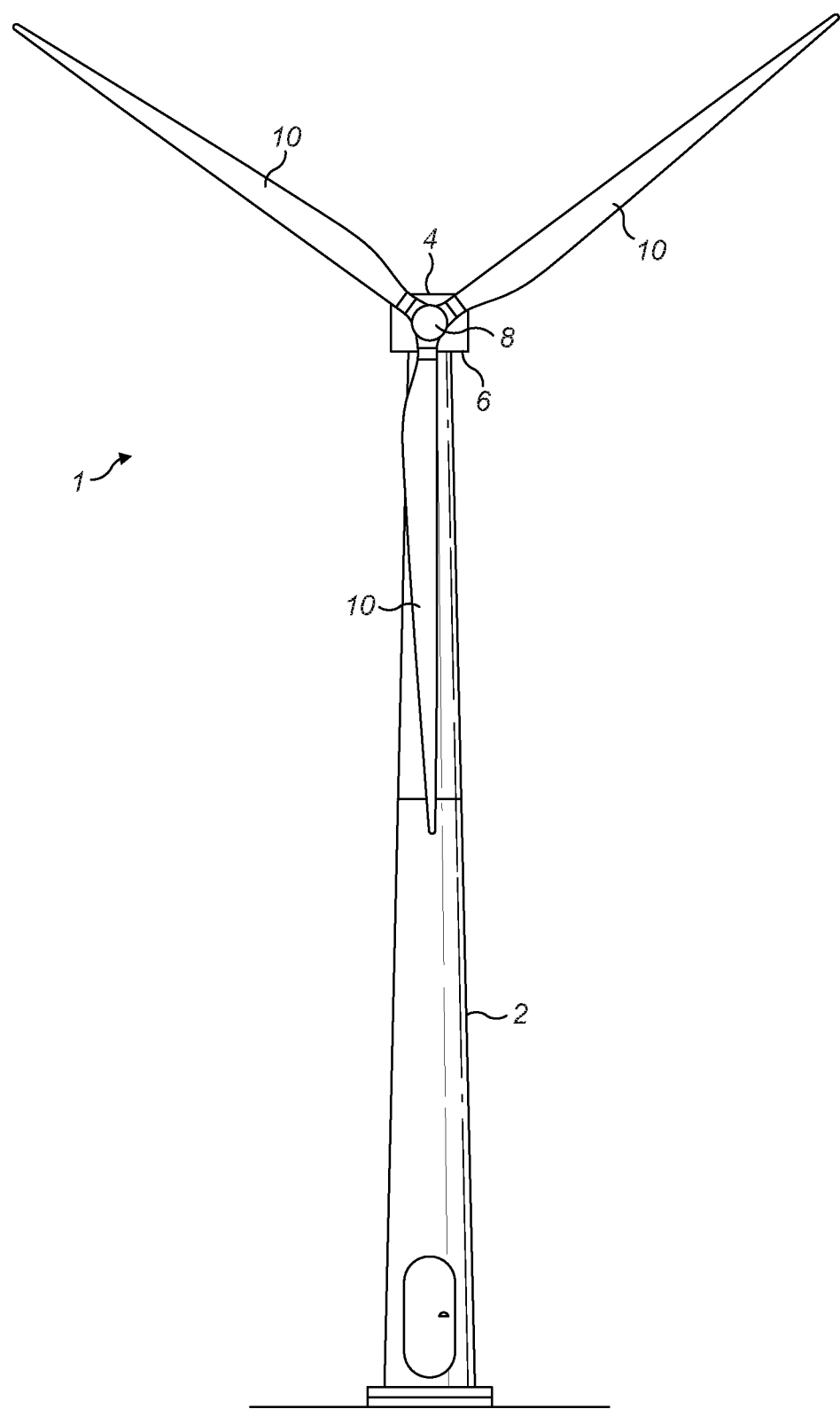
FIG. 1 is a schematic plan view of a horizontal axis wind turbine.

In order to place the embodiments of the invention in a suitable context, reference will firstly be made to FIG. 1, which illustrates a typical Horizontal Axis Wind Turbine (HAWT) 1 in which a generator for a wind turbine according to an embodiment of the invention may be implemented. Although this particular image depicts an on-shore wind turbine, it will be understood that equivalent features will also be found on off-shore wind turbines. In addition, although the wind turbines are referred to as 'horizontal axis', it will be appreciated by the skilled person that for practical purposes, the axis is usually slightly inclined to prevent contact between the rotor blades and the wind turbine tower in the event of strong winds.

The wind turbine 1 comprises a tower 2, a nacelle 4 rotatably coupled to the top of the tower 2 by a yaw system 6, a rotating hub 8 mounted to the nacelle 4 and a plurality of wind turbine rotor blades 10 coupled to the hub 8. The nacelle 4 and rotor blades 10 are turned and directed into the wind direction by the yaw system 6.

Figure 2:
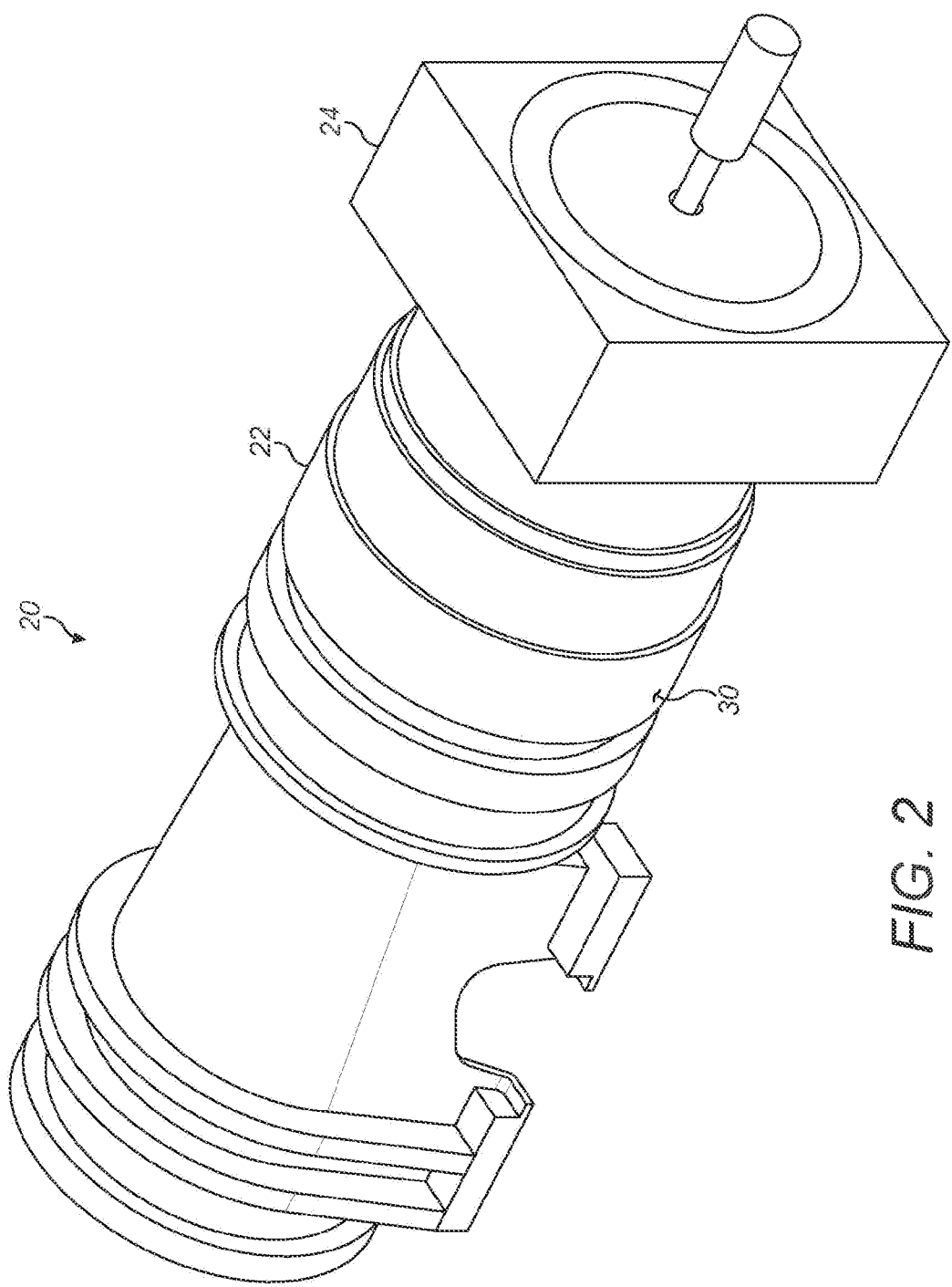
FIG. 2 is a schematic perspective view of functional components of a nacelle of the wind turbine.

The nacelle 4 houses many functional components of the wind turbine, including the generator, gearbox, drive train and hub brake assembly, as well as convertor equipment for converting the mechanical energy of the wind into electrical energy for provision to the grid. With reference to FIG. 2, the nacelle 4 may include a shaft housing 20, a gearbox 22 and a generator 24. A main shaft extends through the shaft housing 20, and is supported on bearings (not shown). The main shaft is connected to, and driven by, the hub 8 and provides input drive to the gearbox 22. The gearbox 22 steps up the rotational speed of the low speed main shaft via internal gears (not shown) and drives a gearbox output shaft. The gearbox output shaft in turn drives the generator 24, which converts the rotation of the gearbox output shaft into electricity. The electricity generated by the generator 24 may then be converted by other components (not shown) as required before being supplied to an appropriate consumer, for example an electrical grid distribution system. As mentioned above, so-called "direct drive" wind turbines that do not use gearboxes are also known. The gearbox may therefore be considered optional.

The gearbox 22 and generator 24 may be coupled together in an integrated unit. The generator 24 and the gearbox 22 are separate sub-assemblies that themselves have been coupled together to create a single assembly that is comparatively compact.

With reference firstly to the gearbox 22, a gearbox housing 30 is generally cylindrical in form and is oriented such that its major rotational axis is horizontal, in the orientation of the drawings. The cylindrical configuration of the gearbox housing 30 is due to the specific type of gearbox that is used in the illustrated embodiment, which is an epicyclic gearbox. As the skilled person would know, an epicyclic gearbox comprises a series of planet gears that are arranged about a central sun gear, and which collectively are arranged within an encircling ring gear. The ratio of the number of teeth between the ring gear, the planet gear and the sun gears determines the gear ratio of the gearbox. For clarity, fine detail of the gearbox will not be described in further detail here as the gearbox is not the principal subject of the invention. Suffice to say that other gearbox configurations could also be used, although it is currently envisaged that an epicyclic gearbox provides an elegant solution fit for the confines of a wind turbine nacelle.

Turning now to the generator 24, the output shaft of the gearbox 22 interfaces with a rotor 32 of the generator 24. As such, the major axis of the gearbox output shaft defines the rotational axis of the generator 24 which corresponds to the central axis of the stator 36. The stator 36 therefore also defines the central axis of the generator.

Figure 3:
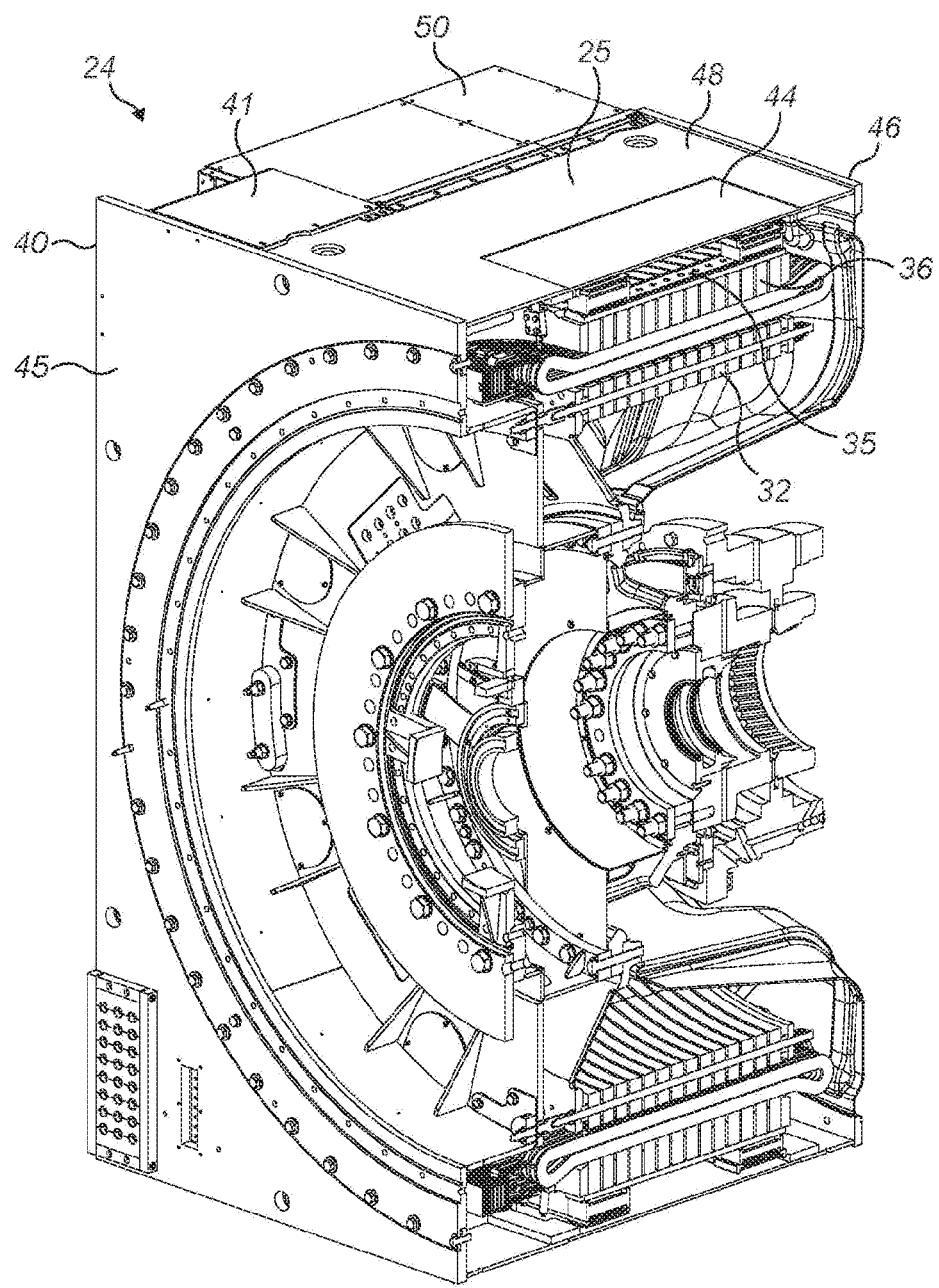
FIG. 3 is a schematic cross-sectional perspective view of a vertical plane taken through a generator of the wind turbine.

The generator 24 in the illustrated embodiment is an IPM (interior permanent magnet) electric machine having an external stator 36 (FIG. 3) which surrounds the rotor 32. The stator 36 includes a stator core and a stator frame which surrounds and supports the stator core. The stator core comprises a plurality of lamina stacked in an axial direction of the generator. Field windings of a conductive material such as copper are wound around the lamina of the stator core. An electrical current is induced in the field windings by a fluctuating magnetic field caused by the magnet attached to the rotor 32 which is rotated in use by the hub 8 of the wind turbine 1. Although the example described herein refers to an interior permanent magnet machine, it will be appreciated that in other examples the generator may comprise a rotor 32 having an electro-magnet instead of permanent magnets.

The generator 24 comprises a frame 40 within which the stator 36 is mounted by a stator mounting system as will be described in greater detail below. The frame 40 has drive end face 46 located, in use, adjacent to the gearbox 22, and a non-drive end face 45 located opposite the drive end face 46 and separated therefrom in the direction of the central generator axis. A plurality of frame members 39, 42 extend between the drive end face 46 and the non-drive end face 45 to provide structural rigidity to the frame 40 and mounting points for the various panels and systems of the generator 24.

The outer surface of the generator defines a generator housing 25 which comprises the drive end face 46 and non-drive end face 45 of the frame 40. The outer surfaces of the housing 25 between the drive end face 46 and non-drive end face 45 comprise panels 41, 48 which are removably attached to the frame 40. Environmental conditioning modules 50 are located at each corner of the frame 40, the outer surfaces of which form the corner portions of the generator housing 25.

Figure 6:
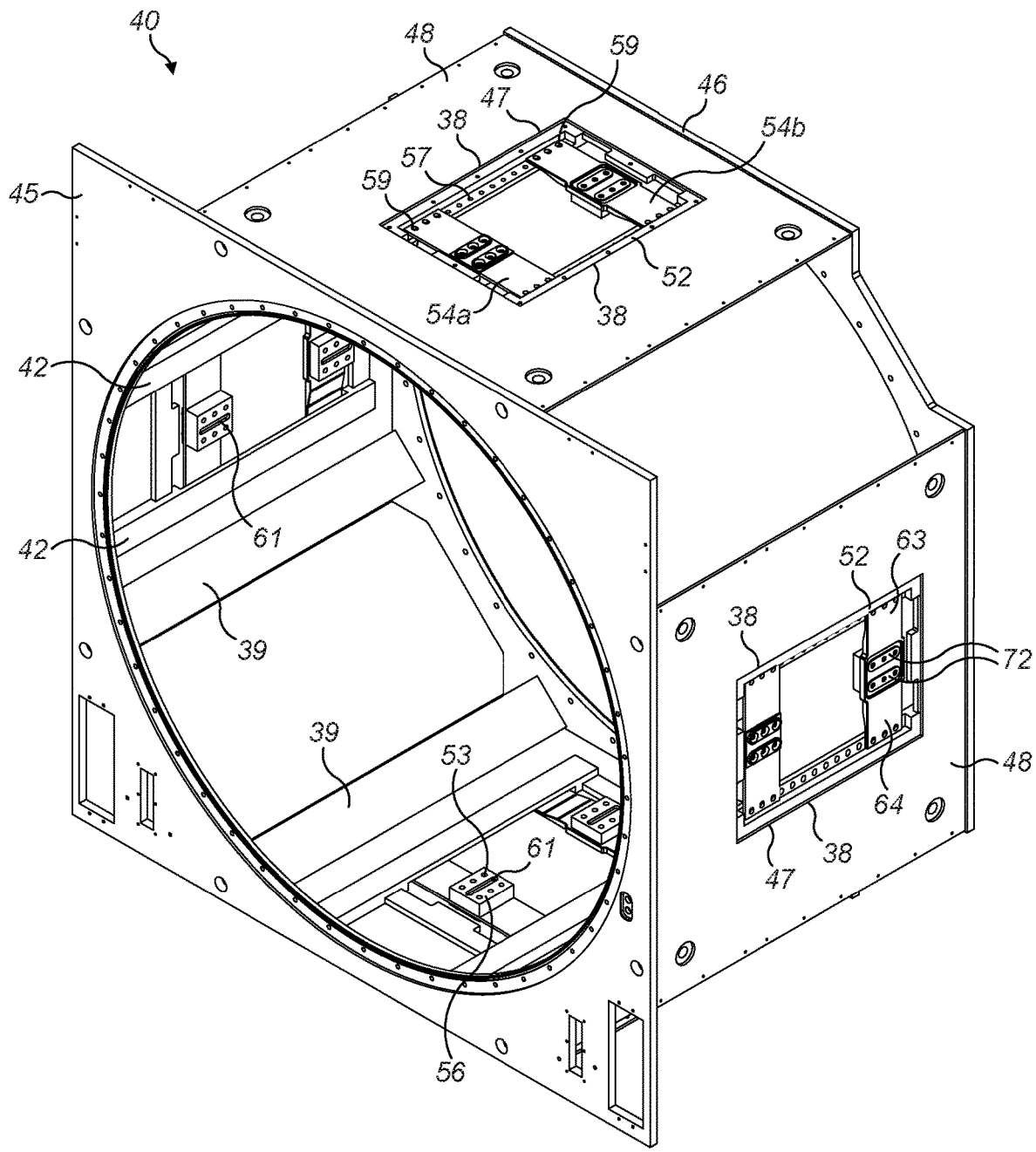
FIG. 6 is a schematic perspective view of a frame to which a stator of the generator is mounted.

Referring to FIG. 6, the panels 48 each comprise an access opening 47 which provide access to a stator mounting 'bay' 52. In this example, the stator mounting system of the generator 24 comprises four stator mounting bays 52 which are equally spaced around the circumference of the stator 36. It will be understood that any suitable amount of stator mounting bays 52 may be used and it is not essential that four stator mounting bays 52 be provided.

In use, the access openings 47 are covered by an access panel 44 which is removably attached to the frame 40 by mechanical fasteners (not shown). In this example, the access panels 44 (also herein referred to as the 'access hatch cover' or the 'access hatch') fit within the access openings 47 such that the panel 48 of the generator housing 25 has a substantially planar finish. However, in an alternative embodiment, the access panels 44 may be attached to the outer surface of the panels 48. Alternatively, the access panels 44 may be connected to the frame 40 or panels 48 by hinges such that the panels 44 must be rotated about their hinges to gain access to the access openings 47.

In this example, each stator mounting bay 52 comprises two stator mounting modules 54a, 54b. For clarity, only one stator mounting bay 52 is described in detail below. However, it will be understood that the configuration of each stator mounting bay 52 is substantially as described below. It is not essential that each stator mounting bay 52 comprise two stator mounting modules 54a, 54b. In alternative designs, the stator mounting bays 52 may comprise only one stator mounting module, or more than two stator mounting modules. Similarly, it is not essential that each stator mounting bay 52 has the same number and/or configuration of stator mounting modules as the other stator mounting bay 52 of the generator 24.

Referring to FIG. 6, a first stator mounting module 54a is located within the bay 52 towards the non-drive end face 45 of the frame 40, and a second stator mounting module 54b is located within the bay 52 towards the drive end face 46 of the frame 40. The stator mounting modules 54a, 54b are removably and adjustably attached to axially extending members 42 of the frame 40 which extend from the drive end face 46 to the non-drive end face 45. The axially extending members 42 are located substantially at each outer axially extending edge 38 of the access openings 47 such that the opening 47 which provides access to the bay 52 comprises a reinforced opening in the housing 25. Each axially extending member 42 comprises a plurality of equally spaced bolt holes 57 for receiving a fixing bolt 59.

Figure 7:
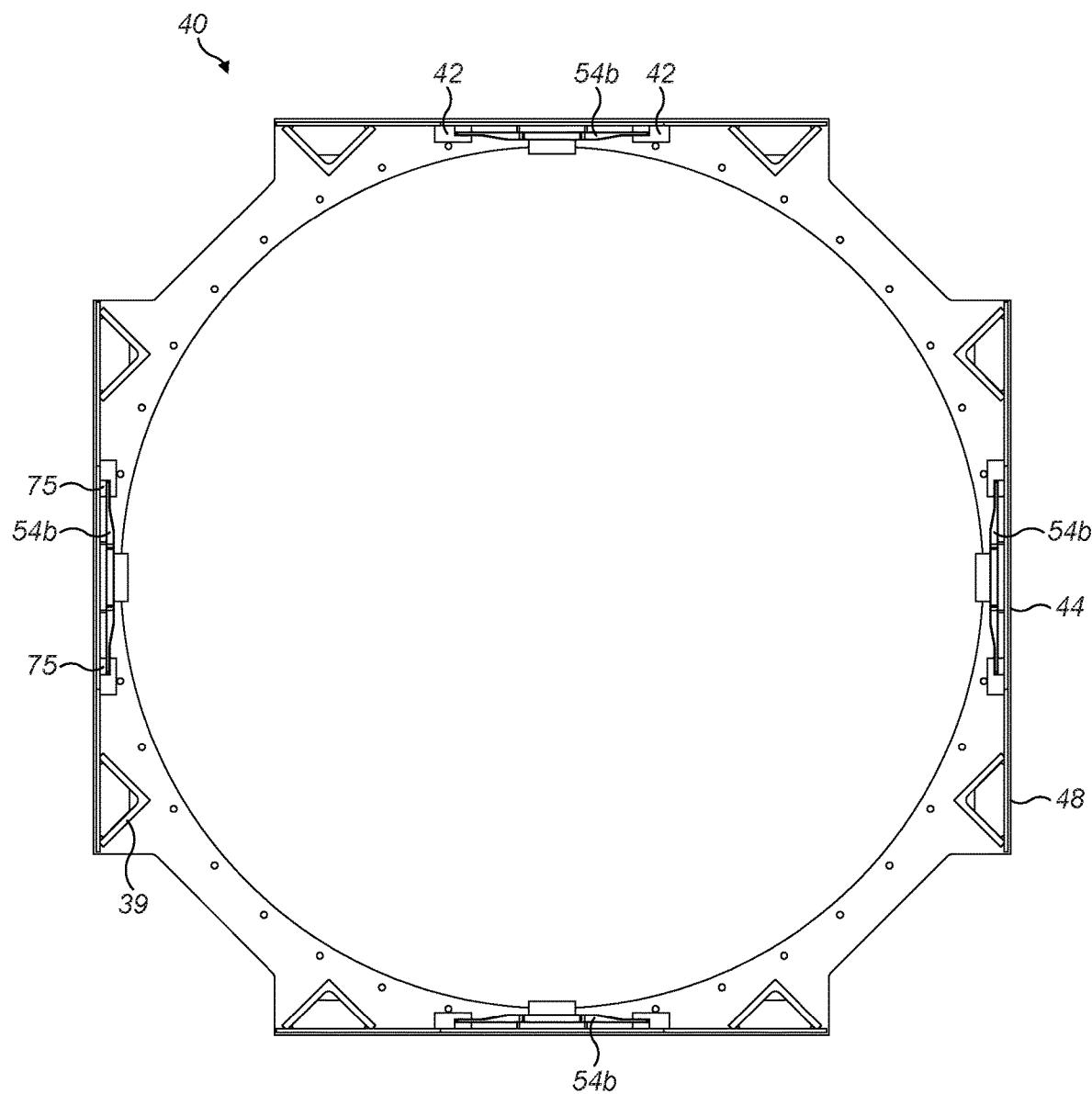
FIG. 7 is a schematic cross-sectional view of the frame of FIG. 6.

The stator mounting modules 54a, 54b each comprise a resilient beam 62a, 62b and a stator mounting member 65a, 65b. The resilient beams 62a, 62b each have first and second ends 63, 64 which comprise three bolt holes 73 through which the fixing bolts 59 pass. The first 63 and second 64 ends of the resilient beams 62a, 62b are removably and adjustably attached to the axially extending members 42 of the frame 40 by the fixing bolts 59 which pass through the holes 73 in the ends 63, 64 of the resilient beams 62a, 62b and engage with the bolt holes 57 in the axially extending member 42. As seen most clearly in FIG. 7, the axially extending members 42 each have an inwardly facing recessed portion 75 facing towards the centre of the access opening 47. The first and second ends 63, 64 of the resilient beams 62a, 62b are attached to the recessed portion 75 of the axially extending members 42.

Each stator mounting member 65a, 65b is removably attached to the stator 36 and to a respective resilient beam 62a, 62b. The stator mounting members 65a, 65b are substantially cuboidal in form and comprise two rows of three mounting holes 53 which pass through the stator mounting members 65a, 65b from a radially outer position to a radially inner position with respect to the central axis of the generator. Each of the three rows of mounting holes 53 in the stator mounting members 65a, 65b correspond to two rows of three mounting holes 72 located substantially in the centre of the resilient beams 62a, 62b. The stator 36 comprises a mounting rail 35 along which a plurality of equally spaced bolt holes 34 are provided.

As can be seen most clearly in FIG. 6, the stator mounting members 65a, 65b have a key slot 61 located substantially in the centre of a radially innermost face 56 of the stator mounting members 65a, 65b extending the direction of the central generator axis. A second key slot 55 extending the direction of the central generator axis is located substantially in the centre of a radially outermost face of the stator mounting members 65a, 65b. The key slots 61, 55 of the stator mounting members 65a, 65b engage with keys (not shown) which are attached to the stator mounting rail 35 and resilient beams 62a, 62b respectively. The engagement of the keys with the key slots 61, 55 helps to transmit torsional loads from the stator 36 to the frame 40 in use. It should be noted that the keys and key slots (61, 55) are not essential and that the friction joints formed between the radially innermost faces 56 of the stator mounting members 65a, 65b and the stator 36, and the radially outermost faces of the stator mounting members 65a, 65b and the resilient beams 62a, 62b may be relied upon for the transmission of torsional loads.

Each stator mounting module 54a, 54b is removably attached to the stator 36 by stator mounting bolts 69 which pass through the mounting holes 72 in the resilient beams 62a, 62b and through the holes 53 in the stator mounting members 65a, 65b. The stator mounting bolts 69 attach to the bolt holes 34 in the stator mounting rail 35.

Figure 4:
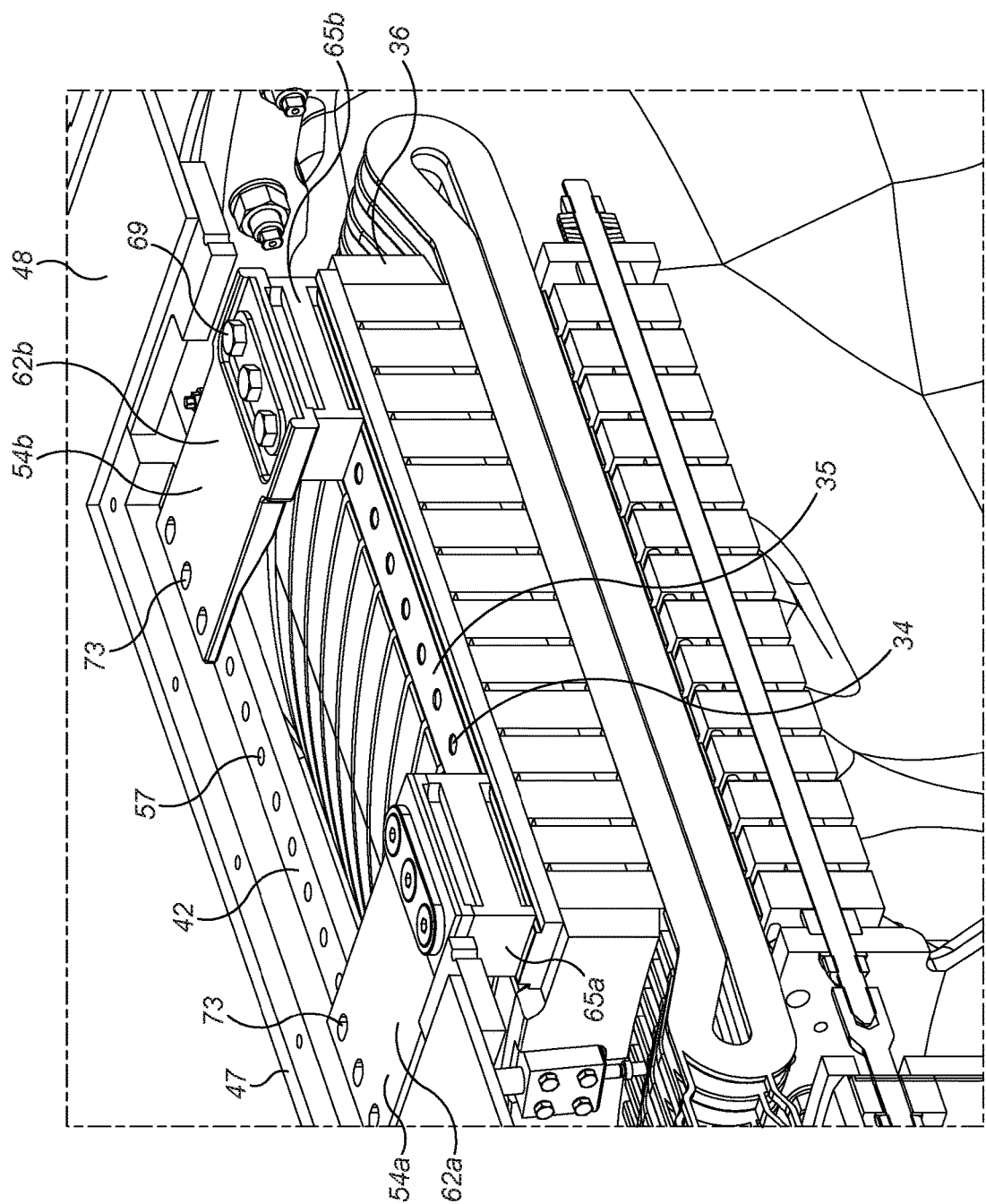
FIG. 4 is a detailed view of part of FIG. 3 focused on a stator mounting bay of the generator with part of the housing removed.
Figure 5:
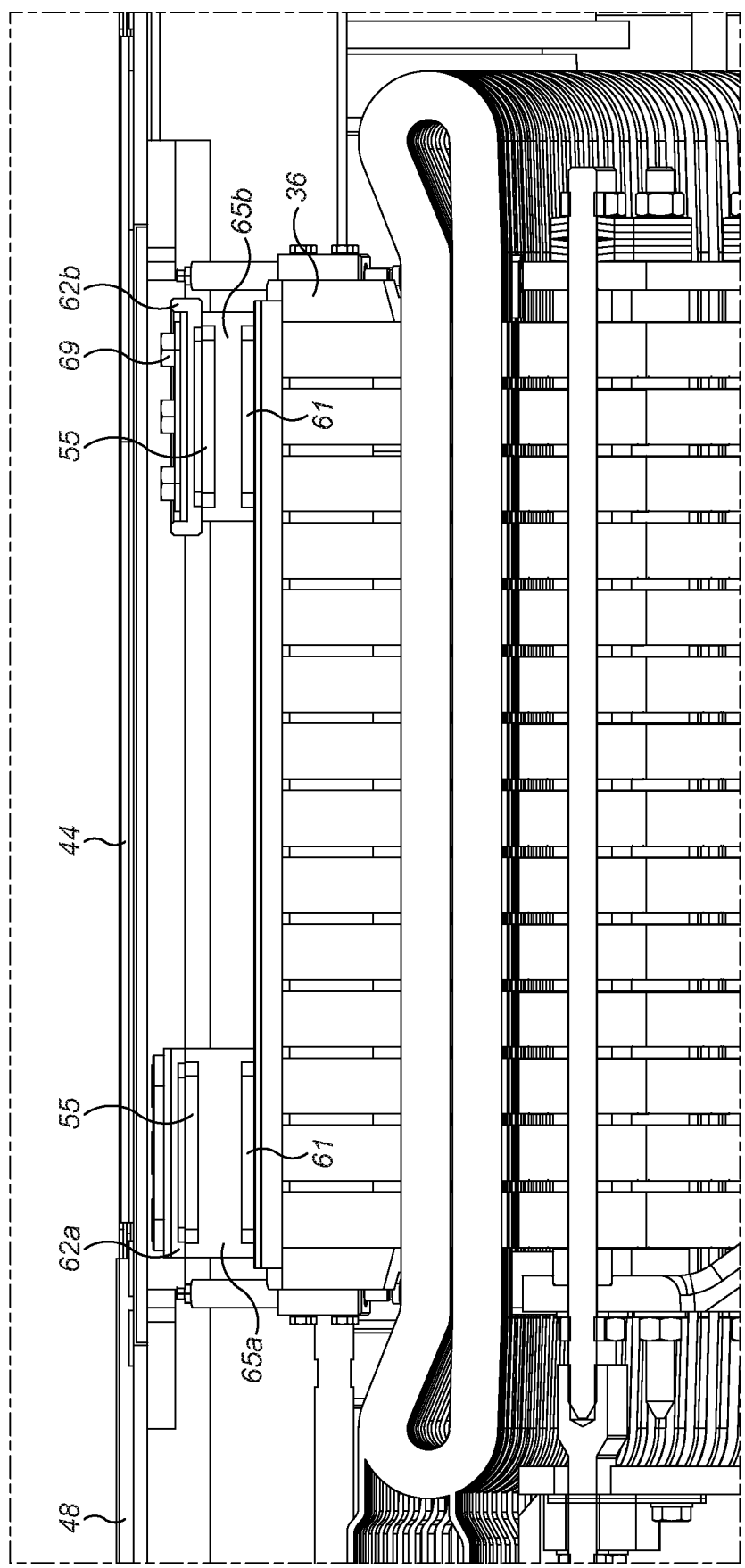
FIG. 5 is a cross-sectional view of the stator mounting bay of FIG. 4 wherein the plane of the view is parallel to the plane of the cross-section.

As can be seen most clearly in FIGS. 4 and 6, the configuration of the first stator mounting module 54a differs from the configuration of the second stator mounting module 54b. Specifically, the cross-sectional area of the resilient beam 62a of the first stator mounting module 54a in a plane parallel to the plane of FIG. 5 is substantially constant from the first 63 to the second 64 end of the resilient beam 62a. In contrast to this, the cross-sectional area of the resilient beam 62b of the second stator mounting module 54b in this plane gradually increases from the first 63 and second 64 ends of the resilient beam 62a towards its centre. The result of this is that each of the resilient beams 62a, 62b, have different mechanical properties such as stiffness and modal behaviour.

The mounting members 65a, 65b of the first 54a and second 54b stator mounting modules also differ in configuration. As most clearly shown in FIG. 5, the mounting member 65a of the first stator mounting module 54a has a greater cross-sectional thickness than the mounting member 65b of the second stator mounting module 54b. The result of this is that each of the mounting members 65a, 65b, have different mechanical properties such as stiffness and modal behaviour.

The difference in the configuration between the stator mounting modules 54a, 54b allows the stiffness and modal behaviour of the stator mounting system to be finely tuned. The resilient beams 62a, 62b and/or the mounting members 65a, 65b of each stator mounting module 54a, 54b may have different width, length or depth dimensions, and/or may be made of different materials. In one example, orthotropic materials may be used to fabricate the resilient beams 62a, 62b and/or the mounting members 65a, 65b in order to tune the mechanical and modal behaviour of the stator mounting modules in different directions.

When the stator 36 is mounted in the frame 40 by the stator mounting system it is supported by the eight stator mounting modules 54a, 54b of the four stator mounting bays 52. Because of the accessible and flexible arrangement of the stator mounting system, it is possible to remove or adjust one or more of the stator mounting modules 54a, 54b when the generator is in situ within the nacelle 4 of a wind turbine 1. This is advantageous as maintenance time can be significantly shortened.

If a stator mounting module 54a, 54b needs to be replaced or repaired, the access hatch cover 44 can be removed or opened and the stator mounting module 54a, 54b can be detached from the frame 40 and the stator 36. The stator mounting module 54a, 54b can then be replaced. If only a part of the stator mounting module 54a, 54b has failed, the mounting module 54a, 54b can be disassembled by separating the resilient beam 62a, 62b from the stator mounting member 65a, 65b. The failed part can then be replaced.

The configuration of the stator mounting system is not only beneficial for maintenance operations, but is also useful for installation of the stator 36 within the frame 40, in particular, adjustment of the stator 36 with respect to the rotor 32. It may be beneficial for any one or more of the mounting modules 54a, 54b to be positioned slightly further towards the non-drive end face 45 or drive end face 46 of the frame 40 in order to improve the relative position of the stator 36 with respect to the rotor 32. It is not necessary that the stator mounting modules 54a, 54b of each stator mounting bay 52 be arranged in the same manner as in each other stator mounting bay 52. The final position of the stator mounting modules 54a, 54b may be determined upon installation of the stator 36 within the frame 40 by selecting the most suitable of the bolt holes 57 of the axially extending member 42 for attachment of the resilient beam 62a, 62b. Should an attachment position of any of the stator mounting modules 54a, 54b turn out to be sub-optimal, the stator mounting modules 54a, 54b in question can readily be repositioned by detachment of the stator mounting module 54a, 54b from the stator 36 and frame 40 and reattachment at a new position.

In an adaptation of the stator mounting module 54a, 54b described above, the bolt holes 73 in the first 63 and second 64 ends of the resilient beam 62a, 62b may comprise slots which extend towards the centre of the access opening 47. In this case, the lateral position of the stator mounting modules 54a, 54b in a direction perpendicular to the central generator axis may be finely tuned by adjustment of the overlap between the resilient beam 62a, 62b and the axially extending members 42. The final position of the resilient beam 62a, 62b with respect to the axially extending members 42 may be fixed by tightening of the bolts 59 or provision of additional fasteners such as location pins for engagement with additional location holes in the axially extending members 42.

Figure 8:
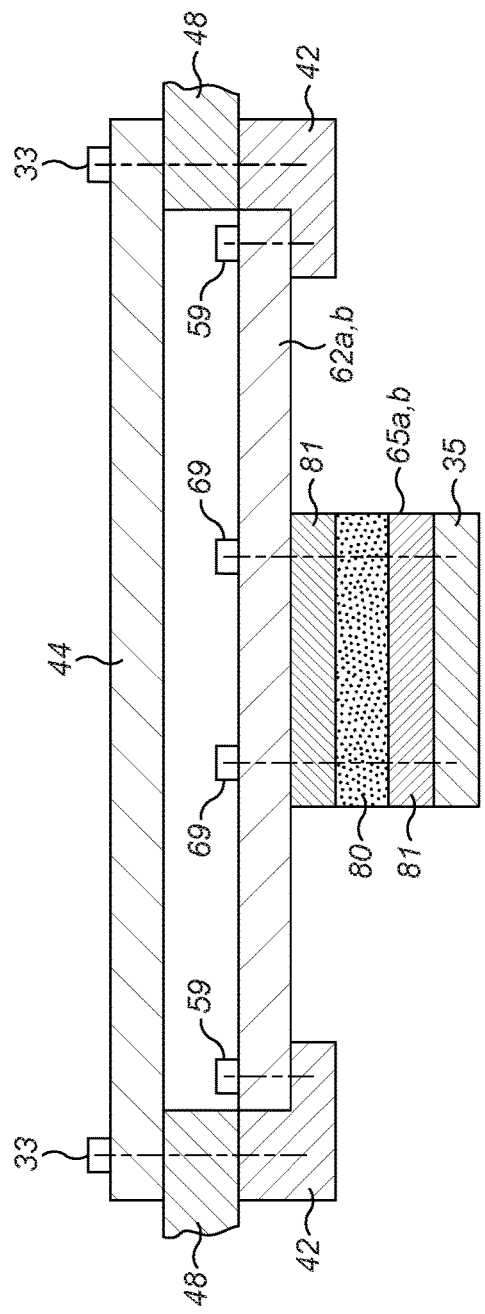
FIG. 8 is a schematic view of an alternative embodiment of the stator mounting module.

In one example, one of more of the mounting members 65a, 65b may have a laminar construction such as that shown schematically in FIG. 8. In this example, the mounting member 65a, 65b comprises a woven glass fibre composite member 80 bonded by a high strength adhesive between steel plates 81. As above the mounting member 65a, 65b is removably attached to the stator 36 by stator mounting bolts 69 which pass through the resilient beam 62a, 62b and mounting member 65a, 65b and fix to bolt holes 34 in the stator mounting rail 35. In the example of FIG. 8, the access hatch 44 is mounted to the panel 48 of the generator housing 25 by removable fasteners 33. One advantage of the arrangement of FIG. 8 is that the mounting member 65a, 65b may comprise an electrically insulating material by the inclusion of the woven glass fibre composite member 80. This is beneficial as direct electrical contact between the stator 36 and the housing 25 may be eliminated thereby minimising the transmission of stray current into the generator drive train. Any suitable electrically insulating material may be used in place of, or in addition to, woven glass fibre composite.

Figure 9:
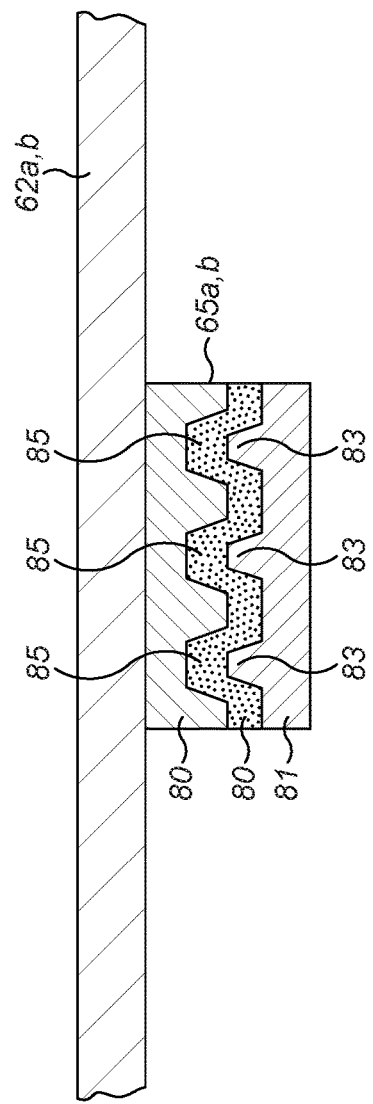
FIG. 9 is a schematic view of an further alternative embodiment of the stator mounting module.

In a further example, the mounting members 65a, 65b may have a laminar construction such as that shown schematically in FIG. 9. In this example, the steel plate layers 81 comprise elongate keys 83 which extend in the direction of the central generator axis in use The woven glass fibre composite member 80 comprises elongate recesses 85 which extend in the direction of the central generator axis in use. Adjacent layers of the laminate mounting member 65a, 65b engage with one another such that the keys 83 of the steel layers 81 engage with the recesses 85 of the glass fibre composite member 80. As above, the layers 80, 81 of the mounting member 65a, 65b are bonded together by an adhesive. The keyed connection between the layers 80, 81 of the mounting member 65a, 65b helps to improve the transmission of torsional loads between the layers.

The cross-sectional profile of the keys 83 and the recesses 85 in the example of FIG. 9 is trapezoidal, however, any suitable profile may be used. Although FIGS. 8 and 9 are described above as comprising one glass fibre composite layer 80 and two steel layers 81, it will be understood that any number of layers may be used as desired. In addition, the materials of the laminate layers 80, 81 are examples only. Any suitable material may be used to form the laminate layers 80, 81.

It will be appreciated that modifications may be made to the example generator 24 described without departing from the scope of the claims that follow. In particular, the resilient beams 62a, 62b may comprise any suitable resilient member such as a leaf spring, rod or plate.

Figure 10:
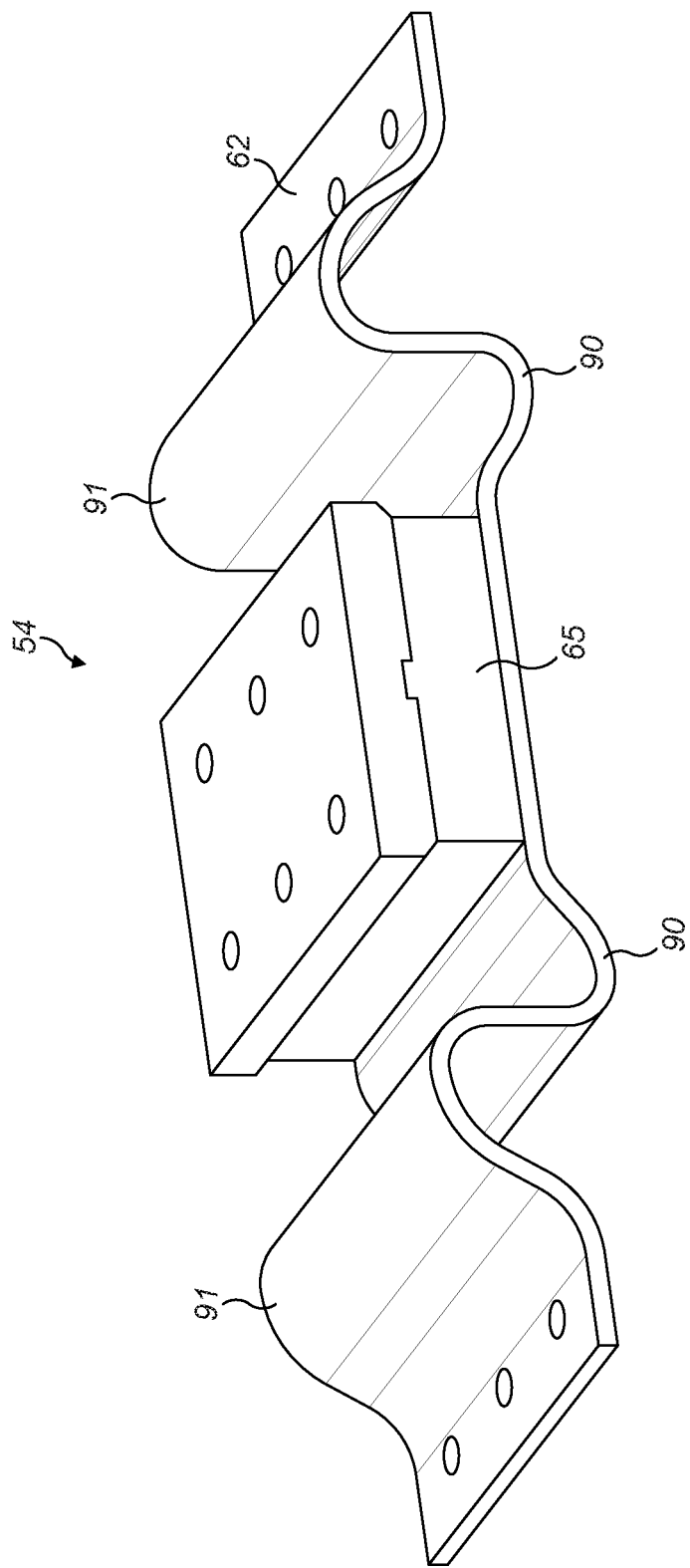
FIG. 10 is a schematic view of a still further alternative embodiment of the stator mounting module.

An example alternative configuration for a stator mounting module is shown schematically in FIG. 10 in which a stator mounting module 54 is shown comprising a mounting member 65 and a resilient beam 62. The resilient beam 62 comprises a bent spring beam having a "double-U" configuration on each side of the mounting member 65. In this example a first U-shaped formation 90 is provided in the region of the beam 62 closest to the mounting member 65 on each side of the mounting member 65 and a second U-shaped formation 91 is provided in the region of the beam 62 furthest from the mounting member 65 on each side of the mounting member 65. The first U-shaped formation 90 extends towards the stator 36 in use and the second U-shaped formation 91 extends away from the stator 36 in use.

It will be apparent to a person skilled in the art that any suitable configuration of resilient beam 62 and mounting member 65 may be used in order to fine tune the performance of the stator mounting system. Furthermore, it will be clear that characteristics of the stator mounting system including, but not limited to the position of the stator 36 relative to the rotor 32, the vibrational performance of the mounting system, and the electrical characteristics of the mounting system may be altered while the stator 36 is in situ mounted within the housing 25. The characteristics of the stator mounting system may be altered by repositioning of existing stator mounting modules 54a,b, or by replacement of the whole or part of a stator mounting module 54a,b by alternative components having different physical and or electrical characteristics. In this way the stator mounting system may be finely tuned in situ to provide the best performance for a particular situation.

The invention claimed is:

1. A generator for a wind turbine, the generator comprising a stator which defines a central axis of the generator, the stator being mounted within a frame by a stator mounting system, wherein the stator mounting system comprises a plurality of stator mounting modules, at least one stator mounting module being removably attached to the stator and removably attached to the frame, wherein the stator mounting system is arranged so that one or more of the stator mounting modules can be replaced with the stator mounted in situ within the frame.

2. The generator for a wind turbine according to claim 1, wherein said at least one stator mounting module is removably attached to the stator by at least one stator mounting bolt and removably attached to the frame by at least one fixing bolt.

3. The generator for a wind turbine according to claim 1, wherein each stator mounting module is removably attached to the stator and removably attached to the frame.

4. The generator for a wind turbine according to claim 1, wherein the frame comprises a frame cover having an access opening through which one or more of the stator mounting modules can be accessed for replacement or repositioning with the stator mounted in situ within the frame.

5. The generator for a wind turbine according to claim 4, wherein the frame cover comprises an access panel removably fitted within or over the access opening.

6. The generator for a wind turbine according to claim 1, wherein the frame comprises a plurality of axially extending members with respect to the central axis of the generator, wherein at least some of the mounting modules are connected to and extend between two of the axially extending members.

7. The generator for a wind turbine according to claim 1, wherein each stator mounting module is adjustably attached to the frame by an adjustable fixture.

8. The generator for a wind turbine according to claim 1, wherein each stator mounting module comprises a resilient member and a mounting member, wherein the mounting member is removably attached to the stator and the resilient member is removably attached to the frame.

9. The generator for a wind turbine according to claim 8, wherein the mounting member is removably attached to the resilient member.

10. The generator for a wind turbine according to claim 8, wherein the resilient member comprises a beam having a first end and a second end, wherein the first and second ends of the beam are directly and removably attached to the frame.

11. The generator for a wind turbine according to claim 10, wherein the beam extends in a direction substantially perpendicular to a central axis of the stator.

12. The generator for a wind turbine according to claim 8, wherein the mounting member of a least one of the mounting modules is of laminate construction comprising a plurality of discrete layers arranged in a stack, wherein at least one of the layers comprises a first material, and wherein at least another of the layers comprises a second material, wherein the layers are stacked in a direction substantially parallel to the central axis of the generator.

13. The generator for a wind turbine according to claim 12, wherein at least one first layer of the mounting member comprises one or more keys, and wherein at least one second layer comprises one or more recesses, wherein the first and second layers are adjacent to one another, and wherein the one or more keys of the first layer engage with the one or more recesses of the second layer.

14. The generator for a wind turbine according to claim 12, wherein at least one of the layers of the mounting member comprises an electrically insulating material.

15. The generator for a wind turbine according to claim 8, wherein one or more of the mounting members comprise a key or a keyhole for engagement with a co-operating keyhole or key located on the stator.

16. The generator for a wind turbine according to claim 8, wherein one or more of the mounting members comprise a key or a keyhole for engagement with a co-operating keyhole or key located on the resilient member.

17. The generator for a wind turbine according to claim 1, wherein the stator mounting system comprises a plurality of stator mounting bays located equidistantly around an outer circumference of the stator, wherein each stator mounting bay comprises at least one stator mounting module.

18. The generator for a wind turbine according to claim 17, wherein each stator mounting bay comprises a plurality of stator mounting modules arranged spaced from one another along a direction substantially parallel with the central axis of the generator.

19. The generator for a wind turbine according to claim 18, wherein the mechanical properties and/or configuration of a first stator mounting module differ from the mechanical properties and/or configuration of a second stator mounting module.

20. A gearbox-generator unit comprising the generator according to claim 1, further comprising a gearbox and wherein said gearbox and said generator are connected such that an output shaft of the gearbox and a central axis of the stator of the generator are co-axial.

21. A method for maintaining a generator for a wind turbine, the generator having features according to claim 1, the method comprising:
removing at least a part of the at least one stator mounting module while at least one other stator mounting module remains attached between the frame and the stator; and
installing at least one replacement part of the at least one stator mounting module.

22. A method for adjusting the stator mounting system of a generator for a wind turbine, the generator having features according to claim 1, the method comprising:
detaching the at least one stator mounting module from a first position while the at least one other stator mounting module remains attached between the frame and the stator; and
reattaching the at least one stator mounting module in a second position.

23. A wind turbine comprising a wind turbine tower, a nacelle rotatably coupled to the tower, a rotating hub mounted to the nacelle, and a plurality of wind turbine blades coupled to the hub, wherein the nacelle comprises a generator according to claim 1.

24. The wind turbine according to claim 23, further comprising a gearbox and wherein said gearbox and said generator are connected such that an output shaft of the gearbox and a central axis of the stator of the generator are co-axial.

25. A generator for a wind turbine, the generator comprising a stator which defines a central axis of the generator, the stator being mounted within a frame by a stator mounting system, wherein the stator mounting system comprises a plurality of stator mounting modules, at least one stator mounting module being removably attached to the stator and removably attached to the frame and located between the frame and the stator, wherein the stator mounting system is arranged so that one or more of the stator mounting modules can be replaced or repositioned with the stator mounted in situ within the frame.

* * * * *